United States Patent Office 3,380,991
Patented Apr. 30, 1968

3,380,991
THIAZOLE AZO ANILINE DYESTUFFS CONTAINING VINYLSULFONYLETH-YL GROUPS
John I. Dale III, James M. Straley, and Max A. Weaver, Kingsport, Tenn., assignors to Eastman Kodak Company, Rochester, N.Y., a corporation of New Jersey
No Drawing. Filed Aug. 30, 1965, Ser. No. 483,781
7 Claims. (Cl. 260—158)

ABSTRACT OF THE DISCLOSURE

Thiazole-azo-aniline compounds having a vinylsulfonylethyl group attached to the aniline nitrogen atom which are useful as dyes for hydrophobic textile materials.

This invention relates to novel water insoluble azo compounds useful as dyes for textile fibers, yarns and fabrics. In particular, the invention is directed to azo compounds containing the vinylsulfonylethyl group.

The azo compounds of the invention have the general formula (I)
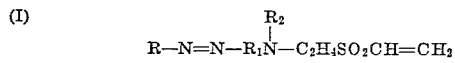
R—N=N—R₁N—C₂H₄SO₂CH=CH₂ wherein R represents a monocyclic 2-thiazolyl radical, that is, a radical having the general formula

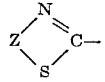

in which Z is a vinylene group, including unsubstituted vinylene and mono- and di-substituted vinylene groups, such as

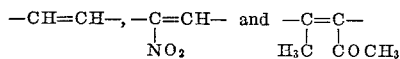

as present in 2-aminothiazole and the substituted 2-aminothiazoles described in the examples and table below. The lower alkyl, lower trihaloalkyl, lower alkylsulfonyl, nitro, cyano, thiocyano and phenyl substituted 2-aminothiazoles are particularly useful in the preparation of the azo compounds;

$R_1$ represents a monocyclic carbocyclic aromatic group of the benzene series derived from an aminoalkylaniline coupling component and including p-phenylene and p-phenylene substituted with lower alkyl, e.g., o,m-methyl-p-phenylene; lower alkoxy, e.g. o,m-methoxy-p-phenylene; halogen, e.g. o,m-chloro-p-phenylene; lower alkylsulfonamido, e.g. o,m-methylsulfonamido-p-phenylene; lower alkanoylamido, e.g. o,m-acetamido-p-phenylene; lower alkylthio, e.g. o,m-methylthio-p-phenylene; and benzamido-p-phenylene.

$R_2$ represents hydrogen or an alkyl radical including unsubstituted alkyl, preferably lower alkyl, i.e. from 1 to 4 carbon atoms, and substituted alkyl such as hydroxyalkyl, e.g. hydroxyethyl; polyhydroxyalkyl, e.g. 2,3-dihydroxypropyl, lower alkoxyalkyl, e.g. methoxyethyl; cyanoalkyl, e.g. cyanoethyl; lower cyanoalkoxyalkyl, e.g. β-cyano-ethoxyethyl; lower alkanoyloxyalkyl, e.g. acetoxyethyl; lower carbalkoxyalkyl, e.g. carbethoxyethyl; halogenoalkyl, e.g. chloroethyl; hydroxyhalogenoalkyl, e.g. β-hydroxy-γ-chloropropyl; lower alkylsulfonylalkyl, e.g. methylsulfonylethyl; lower alkyl-OCOOCH₂—, e.g.

CH₃OCOOCH₂CH₂ carbamoylalkyl, e.g. carbamoylethyl; lower alkylcarbamoylalkyl, e.g. ethylcarbamoylethyl; benzyl, phenoxyalkyl, e.g. β-phenoxyethyl; lower alkylsulfonamidoalkyl, e.g. methylsulfonamidoethyl; dicarboxamidoalkyl, e.g. β-dicarboxamidoethyl, etc. or $R_2$ represents a monocyclic carbocyclic aromatic radical of the benzene series, e.g. unsubstituted phenyl and substituted phenyl such as represented by $R_1$ above, e.g. lower alkylphenyl, lower alkoxyphenyl, halophenyl etc. A preferred group represented by $R_2$ includes hydrogen, alkyl, alkoxyalkyl, phenoxyalkyl, alkanoyloxyalkyl, haloalkyl, hydroxyalkyl, carbethoxyalkyl or cyanoalkyl, the alkyl groups of which are lower alkyl.

As can be seen from the examples given below, the substituents attached to the R, $R_1$ and $R_2$ groups serve primarily as auxochrome groups to control the color of the azo compound.

The azo compounds of the invention are prepared by coupling the diazonium salts of the above-described 2-aminothiazoles with vinylsulfonylethylaniline coupling components having the formula (II)
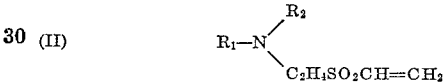

wherein $R_1$ and $R_2$ have the meaning given above.

The coupling components having the Formula II are prepared by the following method:

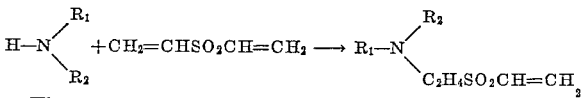

The azo compounds can be used for dyeing textile materials including synthetic polymer fibers, yarns and fabrics giving a variety of fast shades including red, blue, pink and violet when applied thereto by conventional dye methods. The azo compounds have moderate affinity for cellulose ester and polyamide fibers. When the azo compounds are used for dyeing such hydrophobic materials, they should be free of water-solubilizing groups such as sulfo and carboxyl. In general, the dyes have good fastness, for example, to light, washing, gas (atmospheric fumes) and sublimation.

The following examples will serve to illustrate the preparation of representative intermediates and azo compounds of our invention.

EXAMPLES OF VINYLSULFONYLETHLANILINE COUPLERS

Preparation of N-ethyl-N-β vinylsulfonylethyl-m-toluidine 27 g. of N-ethyl-m-toluidine, 23.6 g. divinylsulfone, 5 ml. acetic acid and 100 ml. toluene were mixed together and refluxed with stirring for 12 hours. The solvent was removed under reduced pressure and the product distilled under vacuum at 157–159° C./0.35 mm. The product has the structure:

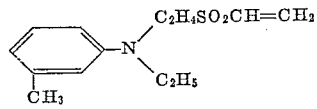

Preparation of N-vinylsulfonylethyl-o-toluidine 53.5 g. o-toluidine, 59.5 g. divinylsulfone, 200 ml. toluene, and 5 ml. acetic acid were mixed together and heated at reflux for 16 hours. The solvent and unreacted starting material were distilled under vacuum. The product distilled at 171–196° C. at 0.5/1.2 mm. Hg, and has the following structure:

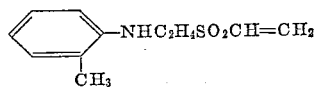

Preparation of N-β-hydroxyethyl-N-β-vinylsulfonylethyl-m-toluidine

In accordance with the method of preparation previously set forth, a solution of divinylsulfone, N-β-hydroxyethyl-m-toluidine and toluene was refluxed to prepare the product which has the structure:

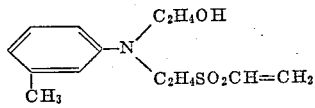

Preparation of N-ethyl-N-β-vinylsulfonylethyl-m-chloroaniline

In accordance with the method of preparation previously set forth, a solution of divinylsulfone, N-ethyl-m-chloroaniline anr toluene was refluxed to prepare the product which has the structure:

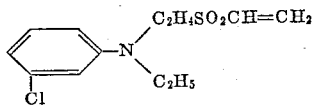

All of the couplers were prepared by the above method.

EXAMPLES OF THE DYES

Example 1

A solution of nitrosyl sulfuric acid was prepared by careful addition of 0.9 g. NaNO$_2$ to 6.25 ml. conc. H$_2$SO$_4$. This solution was cooled to about 3° and 15 ml. 1:5 acid (1 part propionic acid:5 parts acetic acid) was added below 15° C. Then at below 10° 1.45 g. 2-amino-5-nitrothiazole was added, followed by 15 ml. 1:5 acid. The reaction was stirred 2 hours at 0–5° C., then added to a solution of 2.53 g. N-ethyl-N-β-vinylsulfonylethyl-m-toluidine in 25 ml. 1:5 acid. The solution was neutralized to brown on Congo red paper with solid ammonium acetate, coupled two hours, then drowned in water, filtered and washed.

The product dyed cellulose acetate, polyesters, nylon, and the like, deep blue shades. The dye has the structure:

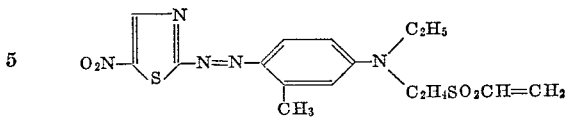

Example 2

A diazonium solution was prepared from the same quantities of reagents and in the same manner as in Example 1 and added to a solution of 2.25 g. N-β-vinylsulfonylethyl-o-toluidine in 25 ml. 1:5 acid. The dye obtained from this reaction dyes polyester and cellulose acetate brilliant violet shades. The dye has the structure:

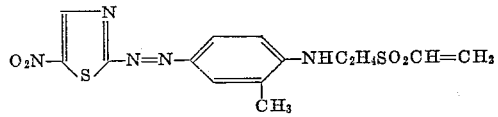

Example 3

A diazonium solution was prepared from the same quantities of reagents and in the same manner as in Example 1 and added to a solution of 2.67 g. N-β-hydroxyethyl-N-β-vinylsulfonylethyl-m-toluidine in 25 ml. 1:5 acid. The resulting dye colors cellulose acetate deep red-violet shades. The dye has the structure:

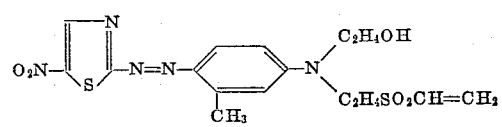

Example 4

A diazonium solution was prepared as in Example 1 using the same quantities of reagents and the same procedure. It was then coupled with 2.73 g. N-ethyl-N-β-vinylsulfonylethyl-m-chloroaniline to give a product which dyes polyester fibers bright red-violet shades. The dye has the structure:

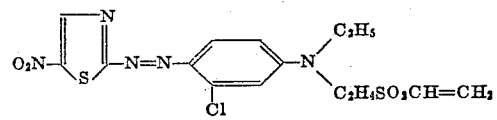

Example 5

Nitrosyl sulfuric acid was prepared from 0.72 g. sodium nitrite and 5 ml. conc. sulfuric acid. The solution was then cooled to 15° C. and 10 ml. 1:5 acid was added below 20° C. Then at below 5° C. 1.79 g. 2-amino-5-bromothiazole was added followed by 10 ml. 1:5 acid. The solution was stirred for two hours at −5° C. to 5° C. and added to a chilled solution of 2.53 g. N-ethyl-N-β-vinylsulfonylethyl-m-toluidine in 25 ml. 1:5 acid. The coupling mixture was neutralized to a brown color on Congo Red paper with ammonim acetate and coupled 1½ hours. The solution was drowned in water, filtered and the precipitate washed with water. The product dyes cellulose acetate, polyesters and nylon bright pink shades. The dye has the structure:

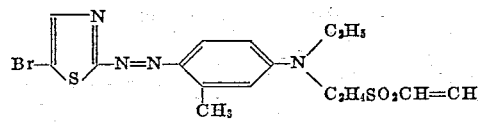

The azo compounds of the following table were prepared by the method illustrated in Examples 1 through 5. Thus, the diazonium salts were coupled with the vinylsulfonylethylaniline couplers of Formula II to obtain dyes having the general structure illustrated in Formula I, above.

TABLE

| Ex. | Substituents on Thiazole ring | $R_1$ | $R_2$ | Color |
|---|---|---|---|---|
| 6 | 5-$NO_2$ | m-Tolylene | —$C_2H_5$ | Violet. |
| 7 | 5-$NO_2$ | do | $CH_2CH_2CN$ | Do. |
| 8 | 5-$NO_2$ | do | $CH_2CH_2Cl$ | Do. |
| 9 | 5-$NO_2$ | do | $CH_2CH_2OCH_3$ | Do. |
| 10 | 5-$NO_2$ | do | $CH_2CH_2OCOCH_3$ | Do. |
| 11 | 5-$NO_2$ | do | $CH_2CH_2N(COCH_3)_2$ | Do. |
| 12 | 5-$NO_2$ | do | $CH_2CH_2CO_2C_2H_5$ | Do. |
| 13 | 5-$NO_2$ | do | $CH_2CH_2Br$ | Do. |
| 14 | 5-$NO_2$ | do | $CH_2CH_2SO_2CH_3$ | Do. |
| 15 | 5-$NO_2$ | do | $CH_2CH_2CONH_2$ | Do. |
| 16 | 5-$NO_2$ | do | —$CH_2CH_2N$(phthalimide) | Do. |
| 17 | 5-$NO_2$ | do | —$CH_2CH_2OCONH$-phenyl | Do. |
| 18 | 5-$NO_2$ | Phenylene | $C_2H_5$ | Do. |
| 19 | 5-$NO_2$ | do | $CH_2CH_2OH$ | Do. |
| 20 | 5-$NO_2$ | m-Chlorophenylene | —$C_2H_5$ | Do. |
| 21 | 5-$NO_2$ | o-Chlorophenylene | H | Red. |
| 22 | 5-$NO_2$ | o-Tolylene | H | Red. |
| 23 | 5-$NO_2$ | 2-$OCH_3$-5-Me phenylene | —$C_2H_5$ | Blue. |
| 24 | 5-$NO_2$ | 2-$OCH_3$-5-$NHCOCH_3$ phenylene | —$C_2H_5$ | Do. |
| 25 | 4-$CF_3$ | m-Tolylene | —$C_2H_5$ | Red. |
| 26 | 4-$CH_3$ | do | —$C_2H_5$ | Red. |
| 27 | 4-$CO_2C_2H_5$ | do | —$C_2H_5$ | Red. |
| 28 | 4-$NHCOCH_3$ | do | —$C_2H_5$ | Red. |
| 29 | None | do | —$C_2H_5$ | Violet. |
| 30 | 4-$CH_3$, 5-$\overset{O}{\overset{\|}{C}}CH_3$ | do | —$C_2H_5$ | Red. |
| 31 | 5-CN | do | —$C_2H_5$ | Violet. |
| 32 | 5SCN | do | —$C_2H_5$ | Red. |
| 33 | 5-Br | do | —$C_2H_5$ | Red. |
| 34 | 5$SO_2CH_3$ | do | —$C_2H_5$ | Red. |
| 35 | 4-phenyl | do | —$C_2H_5$ | Red. |
| 36 | 5-$NO_2$ | do | $C_4H_9$ | Violet. |
| 37 | 5-$NO_2$ | do | $CH_2CHOHCH_2Cl$ | Do. |
| 38 | 5-$NO_2$ | do | $CH_2CH_2N(C_2H_5)_2$ | Do. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. of 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material. As mentioned above, the substituents on the R, $R_1$ and $R_2$ radicals serve primarily as auxochrome groups to control the color of the azo compound.

Polymeric linear polyester materials of the terephthalate type are illustrative of the linear aromatic polyester textile materials that can be dyed with the new azo compounds of our invention. The terephthalate fibers sold under the trademarks "Kodel," "Dacron," and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363 for example, can be dyed. The linear aromatic polyester materials specifically named have a melting point of at least 200° C.

Nylon, in fiber, yarn and fabric form, is representative of polyamides which can be dyed with the compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A water-insoluble azo compound having the formula

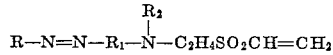

wherein:
R represents a 2-thiazolyl radical;
$R_1$ represents p-phenylene or p-phenylene substituted with lower alkyl, lower alkoxy, chlorine, bromine, lower alkylthio, lower alkanoylamido, benzamido, or lower alkylsulfonamido; and R₂ represents hydrogen; lower alkyl; lower alkyl substituted with lower alkoxy, phenoxy, lower alkanoyloxy, hydroxy, chlorine, bromine, lower carbalkoxy, cyano, lower alkylsulfonyl, lower alkyl —OCOO—, carbamoyl, lower alkylcarbamoyl, lower alkylsulfonamido, succinimido, phthalimido, or phenylcarbamoyloxy; phenyl; or phenyl substituted with lower alkyl, lower alkoxy; chloro, or bromo.

2. A water-insoluble azo compound having the formula

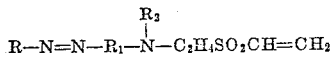

wherein:
R represents 2-thiazolyl or 2-thiazolyl substituted with lower alkyl, trifluoromethyl, lower alkylsulfonyl, nitro, cyano, thiocyano, phenyl, chlorine, or bromine;

R₁ represents p-phenylene or p-phenylene substituted with lower alkyl, lower alkoxy, chlorine, bromine, or lower alkanoylamido; and R₂ represents lower alkyl or lower alkyl substituted with lower alkoxy, lower alkanoyloxy, hydroxy, chlorine, bromine, or cyano.

3. An azo compound having the formula

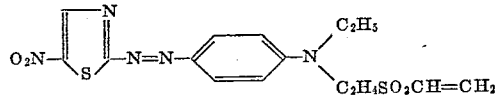

4. An azo compound having the formula

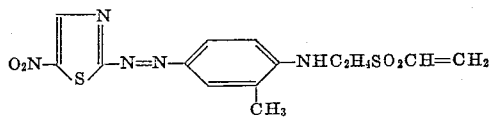

5. An azo compound having the formula

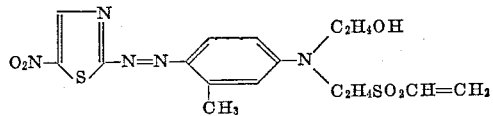

6. An azo compound having the formula

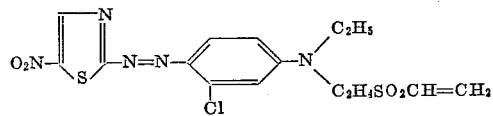

7. An azo compound having the formula

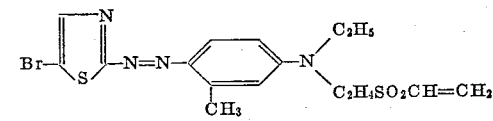

References Cited
UNITED STATES PATENTS
2,784,204   3/1957   Heyna et. al. ____ 260—152 XR FLOYD D. HIGEL, *Primary Examiner.*